United States Patent [19]

Padilla

[11] Patent Number: 4,801,375
[45] Date of Patent: Jan. 31, 1989

[54] WATER VENDING SYSTEM

[75] Inventor: James M. Padilla, Covina Heights, Calif.

[73] Assignee: Cuno Incorporated, Meriden, Conn.

[21] Appl. No.: 15,693

[22] Filed: Feb. 17, 1987

[51] Int. Cl.$^4$ .................. B01D 13/00; B01D 36/00; B67D 5/58

[52] U.S. Cl. .................. 210/100; 210/104; 210/106; 210/110; 210/116; 210/134; 210/138; 210/143; 210/257.2; 364/479; 222/640; 222/190

[58] Field of Search ............... 210/100, 103, 104, 106, 210/110, 116, 128, 129, 134, 135, 137, 138, 141, 143, 195.2, 257.2; 222/640, 641, 644, 108, 189, 190; 364/479

[56] References Cited

U.S. PATENT DOCUMENTS

| | | | |
|---|---|---|---|
| 2,679,308 | 5/1954 | Moore et al. | 222/20 X |
| 2,980,224 | 4/1961 | Bookout et al. | 194/13 |
| 3,115,822 | 12/1963 | Totten | 210/433 X |
| 3,133,671 | 5/1964 | Christine et al. | 121/14 |
| 3,207,282 | 9/1965 | Norris, Jr. | 194/13 |
| 3,221,859 | 12/1965 | McAbee | 194/3 |
| 3,355,382 | 11/1967 | Huntington | 210/321 X |
| 3,390,773 | 7/1968 | Merten | 210/321 X |
| 3,462,362 | 8/1969 | Kollsman | 210/321 X |
| 3,526,320 | 9/1970 | Kryzer | 210/257.2 |
| 3,542,199 | 11/1970 | Bray et al. | 210/257 X |
| 3,550,782 | 12/1970 | Veloz | 210/257.2 |
| 3,552,566 | 1/1971 | Lowe et al. | 210/321 X |
| 3,684,094 | 8/1972 | Chamberlin et al. | 210/254 X |
| 3,846,295 | 11/1974 | Gibbs | 210/138 |
| 3,856,676 | 12/1974 | Grimme, Jr. et al. | 210/96 |
| 3,976,225 | 8/1976 | Koeneker | 222/108 |
| 4,160,727 | 7/1979 | Harris, Jr. | 210/257.2 |
| 4,391,712 | 7/1983 | Tyler et al. | 210/652 |
| 4,414,113 | 11/1983 | LaTerra | 210/636 |
| 4,528,093 | 7/1985 | Winer | 210/257.2 |
| 4,548,716 | 10/1985 | Boeve | 210/652 |
| 4,615,799 | 10/1986 | Mortensen | 210/192 |
| 4,623,467 | 11/1986 | Hamlin | 222/189 |

OTHER PUBLICATIONS

The Purolite Company's product bulletin entitled NRW 37 Mixed Bed, Jun. 1986, three (3) pages.

*Primary Examiner*—Richard V. Fisher
*Assistant Examiner*—Linda S. Evans
*Attorney, Agent, or Firm*—F. Eugene Logan

[57] ABSTRACT

The invention is related to water vending systems for the automatic dispensing of purified water from a machine which is preferably activated by coin or other form of payment. Reverse osmosis filtration of local water together with other water treatment operations is used to improve the quality of the vended water. Stagnation of stored permeate is automatically prevented to assure the freshness of dispensed water. The system is designed to reduce the frequency of servicing and the life of components without decreasing the quality of the vended water. In one embodiment the vending system comprises control means for automatically dumping the filtered water stored in a tank in the system if there has not been at least a predetermined number of vends of water within a predetermined period of time. After the storage tank has been dumped the drain is automatically closed and fresh filtered water is produced to refill the storage tank. Another embodiment allows the storage tank to remain at atmospheric pressure at all times thereby preventing leaks due to high pressure or aspiration due to below atmospheric pressure in the system. Contamination of the filtered water in the storage tank by breather air is prevented by ultraviolet sterilization of such breather air continuously before it enters the tank.

26 Claims, 6 Drawing Sheets

PERMEATE PRODUCTION MODE AND FLUSH MODE

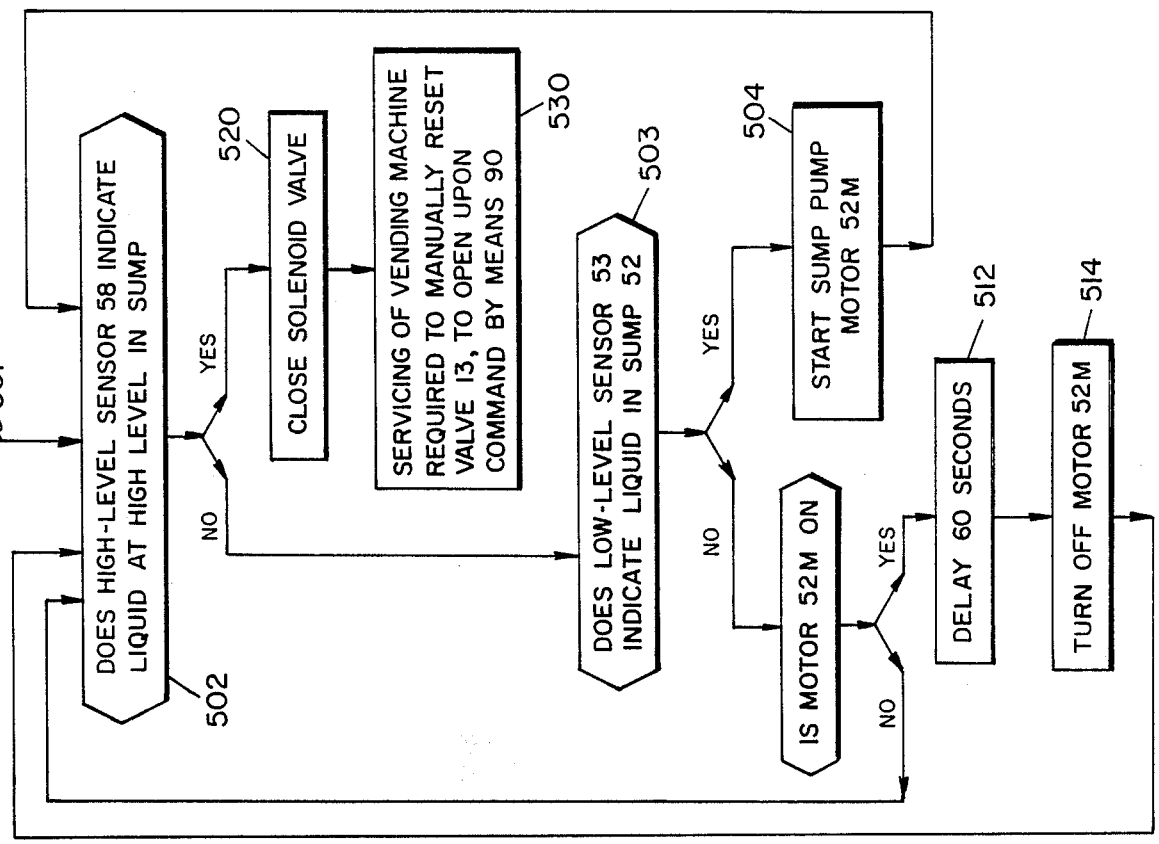
FIG. 5 SUMP MODE
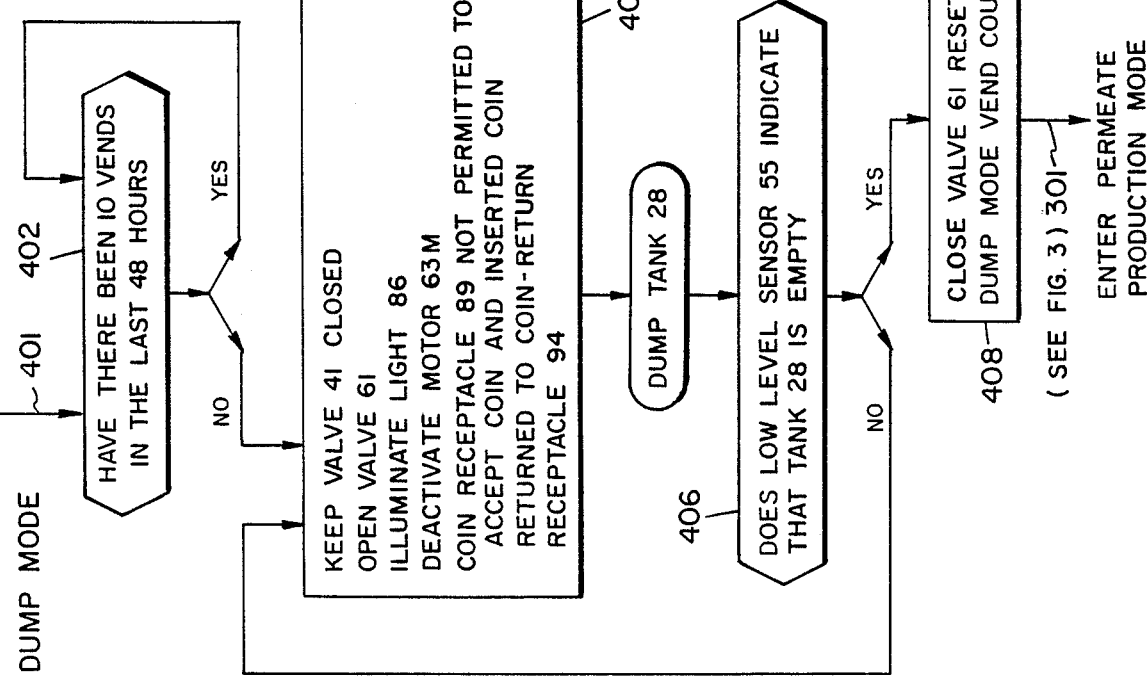
FIG. 4 DUMP MODE

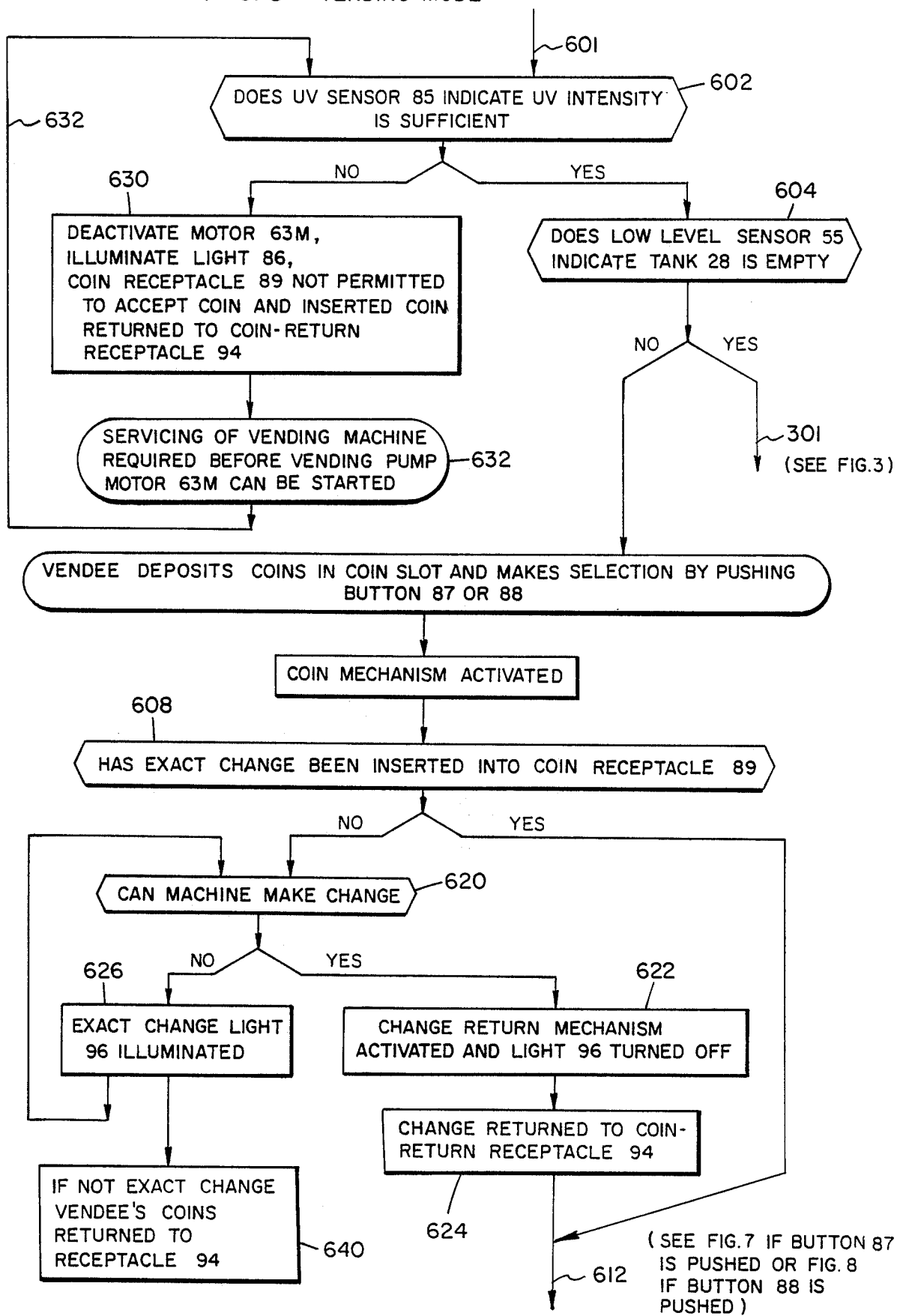

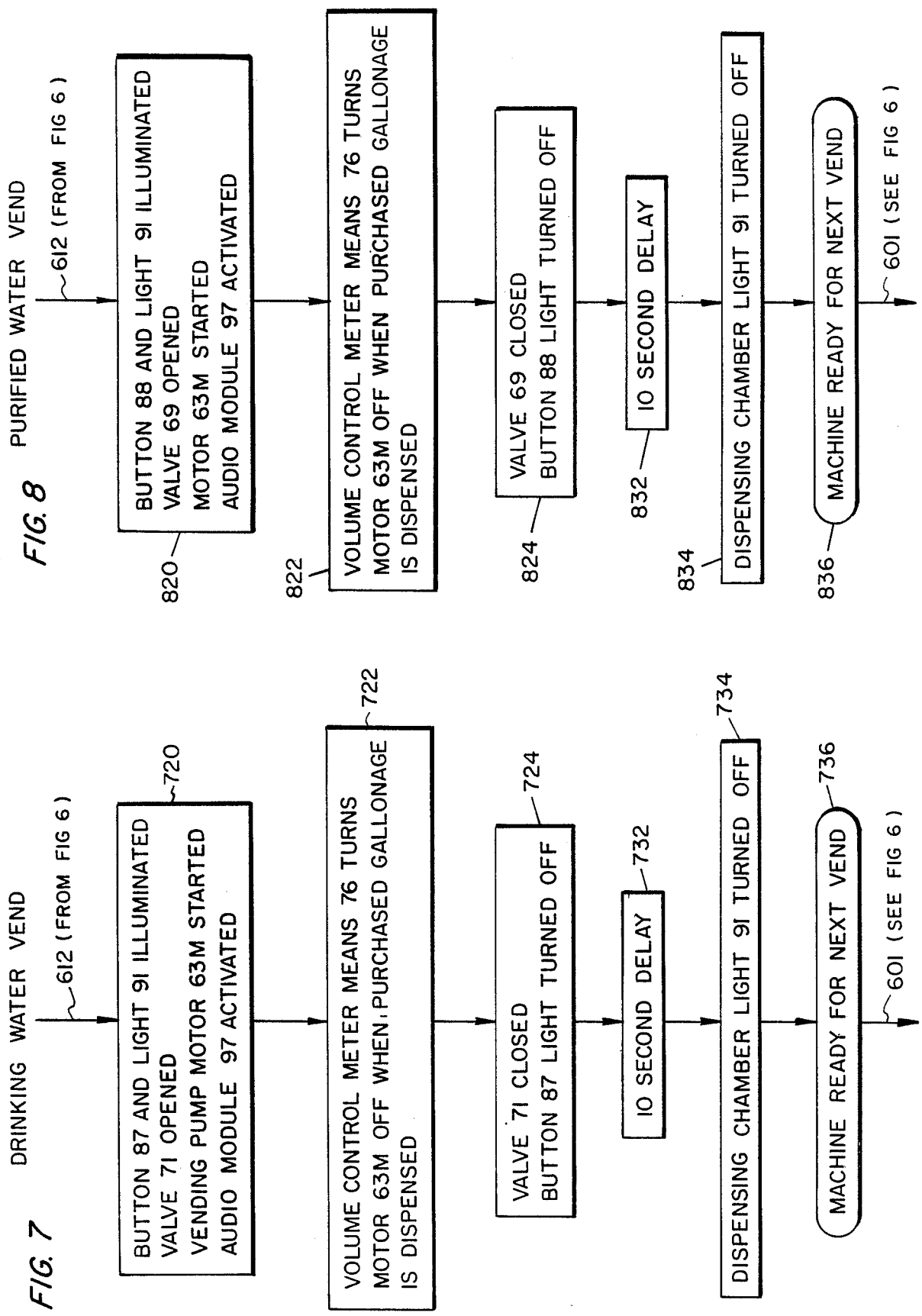

WATER VENDING SYSTEM

BACKGROUND OF THE INVENTION

The present invention relates to an improved water vending system for automatic dispensing of purified water from a vending machine. The vending system uses reverse osmosis as the main method of improving the quality of water.

Water filtering systems using reverse osmosis are disclosed in U.S. Pat. Nos. 3,856,676; 4,391,712 and 4,414,113. Use of ultraviolet light is disclosed in U.S. Pat. No. 4,548,716. Drip collection systems are disclosed in U.S. Pat. Nos. 2,980,224 and 3,976,225. Systems measuring the purity of water are disclosed in U.S. Pat. Nos. 3,207,282; 3,221,859, and 3,856,676. Some of these patents also disclose coin activated mechanisms as well as U.S. Pat. No. 3,133,671.

SUMMARY OF THE INVENTION

There is provided by this invention a improved vending machine or apparatus for the dispensing of water of more desirable quality. The vending apparatus comprises apparatus-inlet means for introducing water into the vending apparatus; module-pump means, having a module-pump inlet and a module-pump outlet, for pumping water to an elevated pressure; inlet-pump connective means for connecting the apparatus-inlet means to the module-pump inlet; a reverse osmosis module having a module inlet for introducing water into the module, a semipermeable membrane operable for separating water pumped into the module under pressure into (i) a permeate containing a reduced amount of solids and dissolved substances, and
(ii) a concentrate containing enriched amounts of solids and dissolved substances, a permeate module outlet in a first part of the module for removing permeate and a concentrate module outlet in a second part of the module for removing concentrate, the second part being separated from the first part by the membrane; pump-module connective means for connecting the module-pump outlet to the module; disposal-outlet means, connected to the concentrate module outlet, for discharging concentrate from the vending apparatus to a drain; water tank having a tank inlet and a tank outlet; module-tank connective means for connecting the permeate module outlet to the tank inlet; vend-pump means, having a vend-pump inlet and a vend-pump outlet, for pumping water from the water tank; tank-pump connective means for connecting the tank outlet to the vend-pump means; dispensing means, having a dispensing inlet and a dispensing outlet, for dispensing water from the vending apparatus; and pump-dispensing connective means for connecting the vend-pump outlet to the dispensing inlet.

In one embodiment the vending apparatus further comprises dump valve means, operable for activation by signal from a control means, and having a dump valve inlet and a dump valve outlet; tank-valve connecting means for connecting the tank outlet to the valve inlet, the dump valve means for shutting off the flow of water in the tank-valve connective means; discharge means, connected to the dump valve outlet, for discharging water from the dump valve to a drain. In this embodiment the control means is operable for automatically opening the dump valve means by signal from the control means to the dump valve means if there has not been at least a predetermined number of vends of water within a predetermined period of time, the control means opening the dump valve means for a length of time sufficient to discharge at least substantially all water in the water tank through the dump valve means to the discharge means and thereafter for automatically closing the dump valve means. In a further embodiment the predetermined number of vends is from about 7 to about 13 and the predetermined period of time is from about 1 to about 3 days. In a still further embodiment the predetermined number of vends is about 10 and the predetermined period of time is about 24 hours.

In another embodiment the vend-pump means is operable for activation by signal from the control means. In a further embodiment the control means is operable for automatically preventing the vend-pump means from pumping when the control means opens the dump-valve means thereby preventing water from being vended; and the control means is also operable for automatically permitting the vend-pump means to pump water from the water tank to the dispensing means upon a demand signal from the control means when the dump-valve means is closed thereby permitting the vending of water.

In a still further embodiment, the dispensing means also comprises a conduit section between the dispensing inlet and the dispersing outlet which is transparent to ultraviolet light of a wavelength effective for bacterial and viral destruction; and wherein the vend-pump means is operable for activation by signal from the control means. This embodiment further comprises an ultraviolet light source for radiating the conduit section of the dispensing means, the ultraviolet light source having an ultraviolet intensity operable for effecting sterilization of water flowing through the conduit section of the dispensing means; ultraviolet light sensing means operable for sensing the intensity of ultraviolet light proximate the conduit section of the dispensing means, and operable for sending a signal to the control means related to intensity sensed. The control means is also operable for automatically deactivating the vend-pump means when the intensity of ultraviolet light sensed by the ultraviolet light sensing means is less than a predetermined value.

In a further embodiment the vending apparatus comprises an enclosure surrounding the conduit section of the dispensing means, the ultraviolet light source and the ultraviolet light sensing means, the enclosure permitting the flow of air thereinto; and a breather conduit having one end in communication with the top inside portion of the water tank and the other end in communication with the enclosure, the breather conduit for permitting air radiated by the ultraviolet light source in the enclosure to flow from the enclosure into the top of the water tank when water is removed from the tank thereby permitting the tank to be at atmospheric pressure at all times. The advantage of this embodiment is that the air radiated by the ultraviolet light source in the enclosure contains ozone which enters the water tank thereby retarding bacteria growth in the water tank when apparatus is in use.

In another embodiment the vending apparatus comprises sump means which comprises a basin for collecting water, sump-pump means operable for activation by signal from the control means and having a sump-pump inlet and a sump-pump outlet for pumping water from the basin, low level sump sensor means for detecting water at a predetermined low level elevation in the basin and for sending a signal to the control means of such event, sump-pump connective means for connecting the basin to the sump-pump inlet, and disposal-outlet means connected to the sump-pump outlet for discharging water from the basin and the sump-pump means to a drain. This embodiment further comprises a housing surrounding the module, the water tank and all of the aforementioned means, the basin being in the lower part of the housing and extending across the horizontal inside profile of the housing such that components between the apparatus-inlet means and the disposal outlet means and between the apparatus-inlet means and the dispensing means are above the basin and also such that the horizontal profile of such components lie within the horizontal profile of the basin thereby allowing water leaks from the components to be collected by the basin. In this embodiment the control means is operable for automatically activating, when water is in the basin at an elevation at least as high as the predetermined low level elevation, the sump-pump means for a period of time sufficient to reduce the level of water in the basin to below the predetermined low level elevation, and for automatically deenergizing the sump-pump means when the level of water in the basin is below the predetermined low level elevation. In a still further embodiment the vending apparatus further comprises main-inlet valve means, located in the inlet-pump connective means, for shutting off the flow of water into the module-pump means, the main-inlet valve means being operable for activation by signal from the control means. The sump means further comprises high level sensor means for detecting water at a predetermined high level elevation in the basin and for sending a signal to the control means of such event. The control means is also operable for automatically closing the main-inlet valve means and maintaining the valve means closed until the main-inlet valve means is manually reset when water is detected at said predetermined high level elevation in the basin by the high level sensor means.

In yet another embodiment of this invention the module-pump means is operable for activation by signal from the control means. This embodiment further comprises a prefilter located in inlet-pump connective means operable for removing solid particles from a source of water; main-valve means, operable for activation by signal from the control means and located in the inlet-pump connective means, for shutting off the flow of water into the inlet-pump connective means; pressure sensing means for sensing the gage pressure in the inlet-pump connective means for sending a signal related to such gage pressure to the control means, the pressure sensing means being located downstream of the prefilter. In this embodiment the control means is also operable for automatically closing the main-valve means and deactivating the module-pump means when the pressure sensing means senses that the gage pressure in the inlet-pump connecting means is less than a predetermined value, while simultaneously permitting the vend-pump means to be activated by signal from the control means thereby permitting the vending of water from the apparatus upon demand signal from the control means. In a still further embodiment the main valve means is downstream of the prefilter. In a further embodiment the pressure sensing means is downstream of the main valve means. In one embodiment the predetermined value of gage pressure is from about 3 to about 15 psig.

In another embodiment of this invention the disposal-outlet means has a disposal inlet and a disposal outlet. This embodiment further comprises module-disposal connective means having a flow restrictive means, wherein the disposal-outlet means is indirectly connected to the concentrate module outlet by the module-disposal connective means, wherein the concentrate module outlet is connected to the module-disposal connective means which is connected to the disposal inlet of the disposal-outlet means which is connected to the drain. In this embodiment the vend-pump means is operable for activation by signal from the control means. This embodiment further comprises purity sensor means, located in the module-tank connective means, for sensing the permeate purity therein and for sending a signal related to such permeate purity to the control means; flush bypass line having a bypass inlet connected to the module concentrate outlet and a bypass outlet connected to the disposal inlet, the flush bypass line providing a parallel water flow path to the water flow path provided by the module-disposal connective means; flush valve means, located in the flush bypass line, for stopping the flow of water thereto, and operable for activation by signal from the control means. In this embodiment the control means is operable for automatically opening the flush valve means for a predetermined flush length of time when said purity sensor means senses that the permeate purity is below a predetermined standard, thereby flushing the module and cleansing the semipermeable membrane while simultaneously permitting vend pump means to be activated by signal from the control means thereby permitting the vending of water from the apparatus upon demand signal from the control means. In a still further embodiment the control means is also operable for automatically effecting a second flush of the module if the permeate quality immediately after a first flush is still below said predetermined standard. In yet a further embodiment the apparatus further comprises main-valve means, operable for activation by signal from the control means and located in the inlet-pump connective means, for stopping the flow of water into the inlet-pump connective means. In this embodiment the control means is operable for automatically closing the main valve means and maintaining the main valve means closed until the main valve means is manually reset if after two consecutive module flushes within a predetermined period of time the permeate quality is still below the predetermined standard while simultaneously permitting the vend-pump means to be activated by signal from the control means thereby permitting the vending of water from the apparatus upon demand signal from the control means.

In still another embodiment of this invention the vending apparatus comprises a means for conserving water by recycling a portion of the concentrate from the reverse osmosis module to the ROM. In one embodiment the recycling system consists of a recycle line containing a fixed orifice and a pressure regulator valve in the concentrate discharge line located at a point downstream of the concentrate recycle line. Accordingly there is provided by this invention a vending apparatus which comprises orifice means having an orifice inlet and an orifice outlet; module-orifice connective means for connecting the concentrate module outlet to orifice inlet; orifice-pump connective means for connecting the orifice outlet to the module-pump inlet and for recycle of concentrate to the module; pressure regulator valve having an inlet and an outlet; and module-valve connective means, for connecting the concentrate module outlet to the pressure regulator valve inlet. In this embodiment the pressure regulator valve is adjusted to a predetermined gage pressure at the inlet thereof thereby effecting a predetermined percent of concentrate recycle, such that when the module-pump means is pumping water to the module, the percent of concentrate from the module which is recycled back to the module is predetermined, and wherein only one pressure regulator valve is used to effect the predetermined percent of concentrate recycle. In a still further embodiment the flow regulation means is adjusted to effect a recycle concentrate flow through the orifice means of from about 35 to about 95% of the concentrate flow from the concentrate module outlet. In yet a further embodiment the flow regulation means is adjusted to effect a recycle concentrate flow through the orifice means of from more than 50 to about 85% of the concentrate flow from the concentrate module outlet.

One embodiment of this invention provides a system for dispensing water filtered through a final filter operable for removing organic liquids remaining in the permeate or removing dissolved ionic substances remaining in the permeate. In this embodiment the vending apparatus provides the vendee the option of removing such organic liquids or such ionic substances from the permeate prior to dispensing. In the embodiment in which the deionization means employs a deionization medium, the deionization medium is conserved by reserving its use for vendees desiring deionized or so called "purified water." This embodiment preferably also comprises an automated payment and selection means which permit vendees to make payment for the water by coin, currency or credit card and to make their selection by push button, switch or the like preferably mounted on the face of housing for the vending apparatus.

Accordingly there is also provided by this invention a vending apparatus which comprises flow meter means, having a meter inlet and a meter outlet, for metering a predetermined amount of water and operable for activation by signal from the control means; first pump-meter connective means for connecting the vend-pump outlet to the meter inlet; post filter means, located in the first pump-meter connective means and having a carbon filter for removal of organic contaminants from water pumped therethrough; filter valve means located in the first pump-meter connective means for stopping the flow of water therein and operable for activation by signal from the control means; second pump-meter connective means for connecting the vend-pump outlet to the meter inlet and providing a water flow path from the vend-pump means to the flow meter means which is separate from the water flow path provided by the first pump-meter connective means; deionization means, located in the second pump-meter connective means and comprising a deionization medium for removal of ions from water pumped therethrough; deionization valve means, located in the second pump-meter connective means, for stopping the flow of water therein and operable for activation by signal from the control means; dispensing means, having a dispensing inlet and a dispensing outlet, for dispensing water from the vending apparatus; and meter-dispensing connective means for connecting the meter outlet to the dispensing inlet. In a further embodiment the vending apparatus also comprises payment and selection means, comprising a first and a second selection devices, and operable for activation by manual insertion of a predetermined form of payment into the payment and selection means and manual activation of one of the selection devices, the payment and selection means upon activation being operable for automatically sending a signal to the control means to activate the vend-pump means and the meter means to dispense a predetermined amount of water, wherein if said first selection means is manually activated said payment and selection means sends a signal to the control means which causes it to open the filter valve means, or alternatively if the second selection means is manually activated the payment and selection means sends a signal to the control means which causes the control means to open the deionization valve means. In a further embodiment the post filter means is downstream of the filter-valve means and the deionization means is upstream of the deionization valve means.

These improvements to vending apparatuses for dispensing water provide for a more pleasing product which is assured of being fresh and free of harmful amounts of bacterial and viral substances. Cabinet life and general tidiness of the vend area are improved by effectively collecting and promptly and automatically disposing of water spillages. Economics of the vending operation are improved by conserving water and deionization media. Longevity of system components is enhanced by particular arrangement of such in the flow system.

BRIEF DESCRIPTION OF THE DRAWINGS

FIG. 4 is a diagram of the logic for the dump mode of an embodiment of this invention.

FIG. 5 is a diagram of the logic for the sump mode of an embodiment of this invention.

FIG. 6 is a diagram of the logic for the vending mode of an embodiment of this invention.

FIG. 7 is a diagram of the logic for the drinking water vend which follows from FIG. 6.

FIG. 8 is a diagram of the logic for the purified water vend which follows from FIG. 6.

DETAILED DESCRIPTION AND DESCRIPTION OF THE PREFERRED EMBODIMENTS

Figure 1:
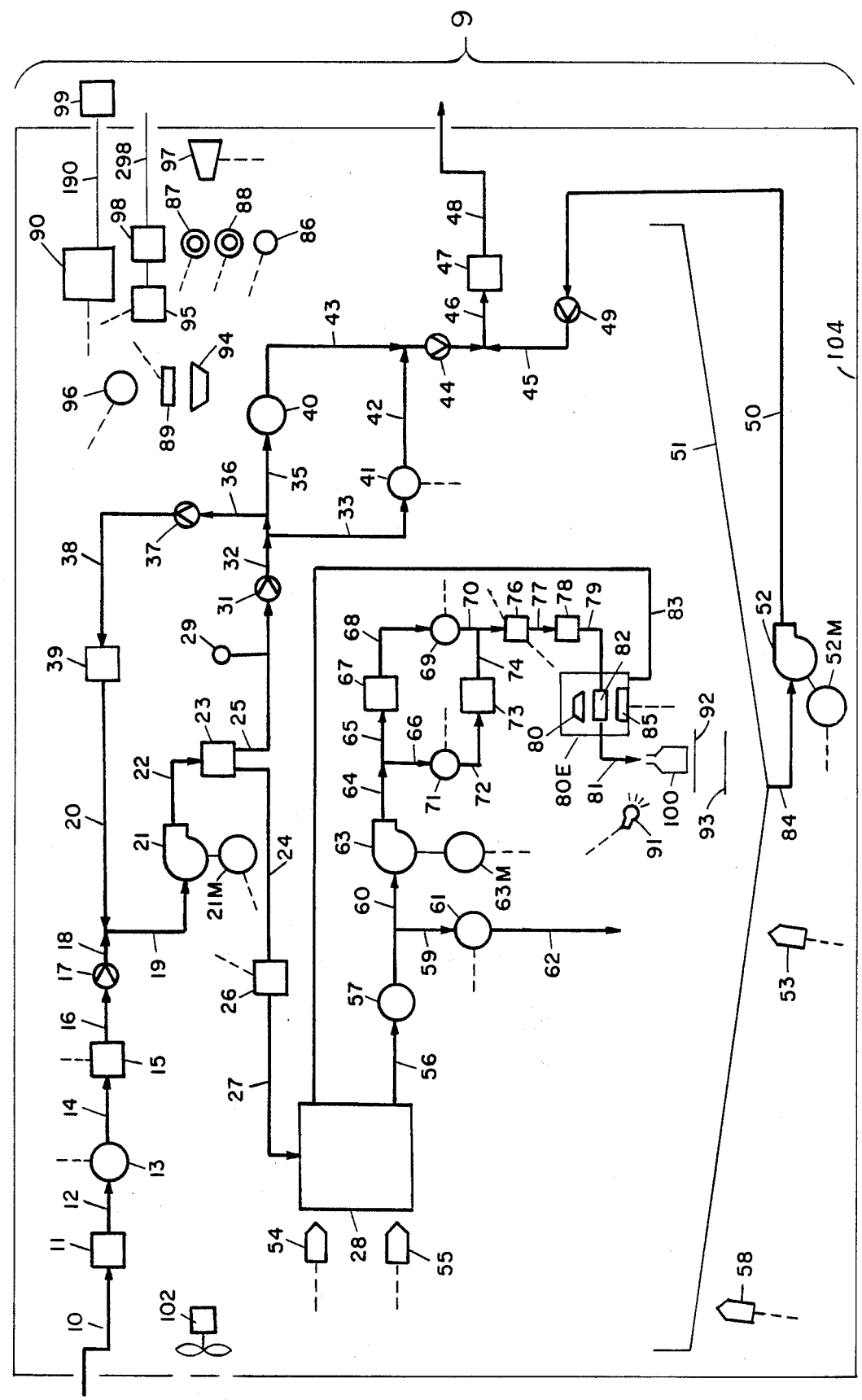
FIG. 1 is a flow diagram of one embodiment of a vending system of this invention.
Figure 2:
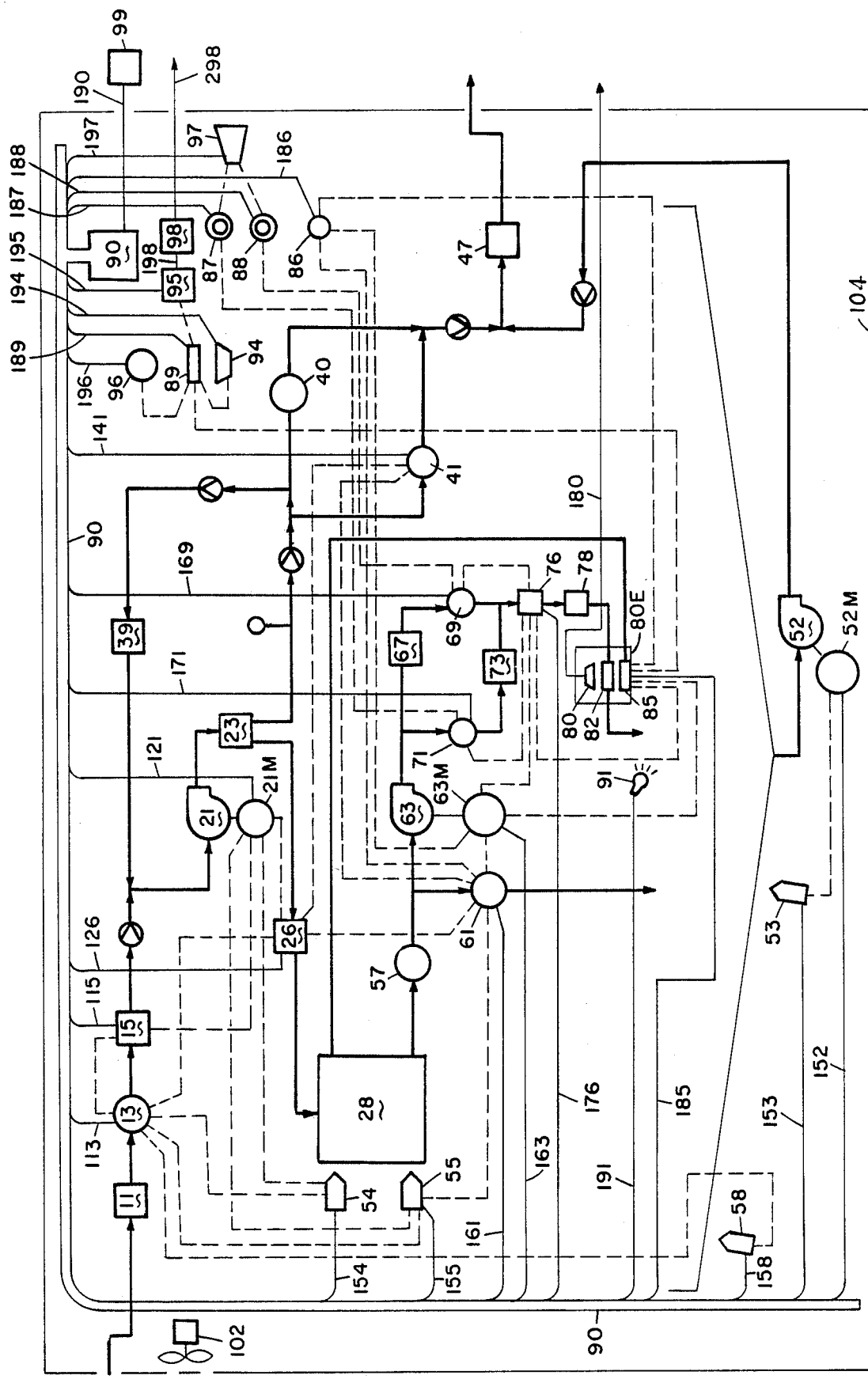
FIG. 2 is a schematic diagram of the control system of the embodiment shown in FIG. 1 showing the relationship between components of the system.

Referring to FIGS. 1 and 2, feed water, or fresh water, or domestic drinking water is introduced into vending system or machine 9 through line 10 and from there into prefilter means 11 which is designed to separate substantially all particles 5 microns (5u) or larger from the water. Filter water is removed from prefilter means 11 through line 12 and introduced into master solenoid valve means 13 the function of which will be explained below. By placing master solenoid valve means 13 downstream of prefilter means 11, the length of time between servicing valve means 13 is increased thereby improving the economics of the process.

Filtered water is removed from solenoid valve means 13 through line 14 and introduced into pressure sensing means 15 and thence into check valve 17 through line 16. From valve 17 the filtered water in line 18 is introduced together with recycled concentrate from line 20 into line 19 and thence into master pump means 21. Pump means 21 is capable of discharging water therefrom at a pressure in excess of about 100 to about 200 pounds per square inch gage (100 to 200 psig) at a flow rate of about 1.2 gallons per minute (1.2 gpm).

If for any reason the water pressure in line 14 is below a predetermined level, for example below about 8 psig, pressure sensing means 15 will send a signal over conduit 115 (FIG. 2) to electronic control means 90 which will turn off pump motor 21M, if it is on, or if it is off, prevent motor 21M from being turned on until adequate water pressure is again sensed by means 15. For most locations an adequate set point for such predetermined pressure level for setting sensor 15 is from about 3 to about 15 psig, preferably from about 5 to about 12 psig, and especially preferably from about 7 to about 10 psig. The setting will of course depend on the local tap water pressure of the water feed source entering through line 10.

In an alternative embodiment, the differential pressure around prefilter 11 can be sensed or the differential pressure around prefilter 11 and solenoid means 13 can be sensed. However, to avoid contamination of sensing means 15, it is preferred to use a pressure sensor downstream of both prefilter 11 and solenoid means 13 as shown in FIG. 1, and to preset sensing means 15 to a predetermined gage pressure at such downstream location thereby eliminating the need to sense pressure upstream of prefilter 11 and the problems associated therewith.

As shown in FIG. 2, electronic control means 90 has been, merely for facilitating illustration, extended around the inside periphery of the vending machine so that the conduits connected thereto, such as conduit 115 and other conduit elements numbered from 113 to 195, can be represented by short lines. One skilled in the art will understand that electrical conduits 113 to 195 can include a plurality of individual wires, circuit boards, wiring harnesses or the like necessary to be operative for the purpose indicated. In a preferred embodiment a programmed circuit board and wiring harness are used in the vending machine. In FIGS. 1 and 2 the water and air lines and mechanical connections are shown as heavy lines. In FIG. 2 the electrical lines are shown as light solid lines. The dashed lines in FIG. 2 represent relationships between the various components or elements controlled by, or activated by, or monitored by, means 90. The dashed lines therefore do not represent actual electrical lines. The dashed lines hence represent a block-like diagram of the components.

Pump mean 21 is driven by motor 21M. Signals transmitted to and from means 90 to the various components are shown by triple dashes in FIG. 1, i.e. - - -. FIG. 2 is a block diagram showing the relationship between electronic control means 90 and the various sensing, controlling, indicating and vendee activated components. The solid lines indicate activity handled or conducted by control means 90. The dotted lines indicate relationship between the sensing elements and operational elements controlled through means 90. Means 90 is connected by line 190 to a source of electrical power by plug means 99.

Pressurized water from master pump means 21 is introduced into reverse osmosis module ("ROM") 23 through line 22. Means 21 preferably is a centrifugal pump. The ROM is designed to have at least about an 85% rejection rate at a product flow of about 200 to about 300 gallons per day (200 to 300 gpd), preferably at least about 90% rejection rate at a flow of about 200 to about 300 gpd, and especially preferably at least about 95% rejection rate at a product flow of about 200 to about 300 gpd. By the term "rejection rate" as used herein is meant the rejection rate of sodium chloride. For example an 85% rejection rate means that if the water entering the ROM through line 19 has a sodium chloride concentration of X parts per million (X ppm), then the concentration of sodium chloride in the permeate or discharged purified water stream from the ROM in stream 24 will be no greater than 0.15 X ppm. Similarly a 90% rejection rate means that the permeate from the ROM has a sodium chloride concentration of no greater than 10% of the sodium chloride concentration of the water stream introduced into the ROM, and a 95% rejection rate means that the permeate has a sodium chloride concentration no greater than 5% of the entering stream concentration.

Permeate is removed from ROM 23 through line 24 and brine concentrate through line 25. Permeate purity is measured by water purity sensor means 26 and thense introduced into permeate holding tank 28 through line 27.

The pressure of the brine concentrate in line 25 is indicated by pressure gage 29. From line 25 the brine concentrate is introduced into check valve 31 and thence into line 32. Line 32 is connected on the downstream side thereof to lines 33, 35 and 36. Recycled concentrate is introduced into flow restrictor means 39 through line 36, check valve 37 and line 38. Preferably flow restrictor means 39 is an orifice type. From means 39 concentrate is recycled into line 19 through line 20. Solenoid valve means 41 is normally closed so that usually there is no flow in line 33 connected to the water inlet of valve means 41 or line 42 connected to the water outlet of valve means 41.

In one embodiment the amount of concentrate recycled in line 38 is from about 35 to about 95% of the concentrate from ROM 23, i.e. the concentrate in line 25. In a preferred embodiment the amount of concentrate recycled is from more than 50 to about 85% of the concentrate from the ROM. In an especially preferred embodiment the amount of concentrate recycled is from about 60 to about 80% of the concentrate from the ROM.

The following parameter notation is used herein which pertains to the condition when the vending machine is in the permeate production mode:
Fi is the water flow into the machine, i.e. in line 10
Fr is the recycle flow, i.e. the flow in line 38
Fm is the flow into the ROM, i.e. the flow in line 22
Fp is the permeate flow, i.e. the flow in line 24
Fd is the drainage flow rate, i.e. the flow in line 36
Fc is the concentrate flow from the ROM, i.e. the flow in line 25
% Recycle is the ratio Fr/Fc expressed in percent
% Yield is the ratio Fp/Fi expressed in percent For most commercial locations for vending water to the general public, for example where individual vendees purchase between 1 to 10 gallons at a time, the following paramaters are useful:

| Range | Parameter (when machine is in the permeate production mode) |
|---|---|
| 0.3 to 5 gpm | Water flow into vending machine, or Fi |
| 0.1 to 1 gpm | Permeate production rate, or Fp |
| 0.1 to 1 gpm | Concentrate discharge rate to drain, or Fd |

-continued

| | |
|---|---|
| 50 to 90% | Concentrate recycle, or Fr/Fc |
| 10 to 50% | Yield, or Fp/Fi |

It is to be understood however that values outside of these ranges can be used if desired.

In one embodiment pressure regulator valve means 40, which is connected to line 32 by line 35, is adjusted so that at a flow rate of about 1 gpm in line 25 the pressure in line 25 is about from about 150 to 200 psig. With pressure regulator valve means 40 set to effect a pressure of from about 150 to 200 psig in line 25, the flow through restrictor means 39 will be about 0.75 gpm and the flow through regulator valve 40 about 0.25 gpm. Concentrate from valve means 40 flows through line 43, thence into check valve 44, thence into antisyphon means 47, and thence into line 48 which discharges the concentrate into a drain. Antisyphon means 47 prevents back contamination of the system from the drain. ROM 23 is designed to produce a permeate flow of from about 200 to about 300 gpd or from about 0.13 to about 0.2 gpm at a flow of about 1.2 gpm into ROM 23. For example, for a flow of about 1.2 gpm of water into the ROM, about 0.75 gpm of which is recycled concentrate, the water consumption by the vending machine when, it is producing water, is about 0.45 gpm. Recycling of a portion of the concentrate back to the ROM will conserve water usage by the unit and improve the economics of the operation.

Some sets of parameter values of interest are:

| Parameter | Case 1 | Case 2 | Case 3 | Case 4 | Case 5 |
|---|---|---|---|---|---|
| Fi (gpm) | 0.45 | 0.90 | 0.90 | 1.35 | 0.60 |
| Fr (gpm) | 0.75 | 0.75 | 2.10 | 1.73 | 2.60 |
| Fm (gpm) | 1.20 | 1.65 | 3.00 | 3.08 | 3.20 |
| Fp (gpm) | 0.20 | 0.20 | 0.20 | 0.20 | 0.20 |
| Fd (gpm) | 0.25 | 0.70 | 0.70 | 1.15 | 0.40 |
| Fc (gpm) | 1.00 | 1.45 | 2.80 | 2.88 | 3.00 |
| % Recycle | 75 | 52 | 75 | 60 | 87 |
| % Yield | 44 | 22 | 22 | 15 | 33 |

In order to maintain ROM 23 in top condition, the ROM is automatically flushed periodically after a predetermined amount of lapsed time to remove any precipitate which has formed on the semipermeable membrane of the ROM. Specifically, electronic control means 90 is designed to send a signal over conduit 141 to solenoid valve means 41, which is normally closed, to open after a predetermined amount of lapsed time. For example, control means 90 can be programmed to open valve means 41 for about a 15 minute flush time once every 10 to 200 hours. Preferably valve means 41 is programmed by control means 90 to open for about 15 minutes once every 12 to 100 hours, and especially preferably for about 15 minutes every 24 hours. Thus valve means 41 can be programmed to open once a day at a time when there is apt to be little demand for purified water; for example, valve means 41 can be opened between 4:00 a.m. and 4:15 a.m. every morning. During the ROM flush operation water will flow at a rate of about 4 gpm through the ROM, valve 31, valve means 41, line 42, antisyphon means 47 and thence to the drain from line 48. The ROM flush time can be varied from 15 minutes if desired. In one embodiment the flush time is from about 5 to about 30 minutes, preferably from about 10 to about 20 minutes, and especially preferably about 15 minutes. Furthermore control means 90 can be designed such that if the water purity, as determined by water purity sensor means 26, does not meet a predetermined standard, means 26 will send a signal over conduit 126 to control means 90 to flush the ROM for the programmed predetermined flush time. If the water purity still does not meet the predetermined standard, control means 90 is designed to shut the flow of water into the vending machine off by signaling valve means 13 over conduit 113 to close and by signaling pump motor 21M over conduit 121 to remain off until the cause of the poor quality of newly produced permeate is corrected. It should be understood that during the ROM flush cycle, essentially all the water going into the ROM goes through ROM 23 and thence to drain. In one embodiment the permeate contained in tank 28 can be vended until tank 28 is empty. This provides an important advantage to the vending machine. Since tank 28 is normally full or nearly full, a substantial number of vends can be made before tank 28 is emptied. When tank 28 is emptied the dispensing mechanism of the vending machine becomes deactivated until the water level in tank 28 reaches the elevation of low level sensor 55. During this period of time the necessary maintenance to the machine can be completed, for example to correct whatever is causing low quality permeate product or low pressure at sensor means 15, thereby allowing the machine to remain on stream and in the dispensing mode essentially at all times except of course for the relatively short period of time for corrective maintenance. In one embodiment the machine comprises telephone modem 98 which permits frequent remote retrieval of diagnostic information thereby enabling even faster servicing of the machine before the permeate inventory in tank 28 is depleted. Accordingly, in one embodiment the vending machine is designed to have sufficient permeate storage capacity in tank 28, which based on the frequency of vends for the location in which the machine is placed, which in combination with normal maintenance schedules, allows water to be dispensed at the normal vending rate for that location even after water purity sensor means 26 or pressure sensor means 15 causes solenoid means 13 to close. Thus in this embodiment the machine is capable of continuing to vend at its normal rate of vends at all times even though the machine cannot make additional high quality permeate until the low water quality problem or low pressure at sensor means 15 is corrected.

Preferably water purity sensor means 26 is of the conductivity sensing type, i.e. means 26 senses the electrical conductivity of the ROM permeate which is related and nearly proportional to the ppm of dissolved solids. Preferably electronic control means 90 comprises recording means 95 which records the purity of the permeate as measured by means 26 about every three hours thereby enabling the history of the permeate quality over days, weeks, and months to be reviewed periodically to be sure that at all times the vended water quality had met the required standards and all quality control mechanisms were functioning as designed. In a preferred embodiment the water quality is controlled by setting the set point of sensor means 26 for a predetermined percent rejection. In one embodiment in which ROM 23 is designed to have a rejection rate of about 95%, the set point of the sensor means 26 is set for a rejection percent of from about 80 to about 85% of the average normal concentration of sodium chloride in the feed water to the system, i.e. the water entering in line 10, thereby allowing a margin of from about 15 to about 10% before correction for recycle, compared to the actual design capability of the ROM. This margin allows for variation in feed water quality coming into the system through line 10. The design rejection rate of ROM 23 and the set point for water purity sensor means 26 must be such that the vending machines will meet or surpass governmental water quality standards. Obviously the rejection rate set point for means 26 should not be set higher than the design rejection rate of ROM 23 adjusted for the percent recycle.

As mentioned, the permeate from ROM 23 is introduced into tank 28. High and low level sensor means 54 and 55 respectively, positioned at predetermined elevations relative to the tank, react to the amount of water in tank 28. Preferably sensor means 54 and 55 are of the proximity sensing type and are totally outside of tank 28 as shown in FIG. 1. The use of proximity sensors prevents possible contamination of the purified water in the tank due to level sensors which protrude into the tank. Nonlimiting examples of proximity sensors suitable for this use are those sold under the trademark Omron model E2K which will detect water without direct contact.

In one embodiment, permeate production is initiated after a predetermined amount of water is vended or after a predetermined number of vends. For eaample in one embodiment permeate production is commenced after vending from about 3 to about 30 one gallon vends, preferably after about 5 to about 20 one gallon vends, and most preferably after about 10 such vends. Permeate production is also commenced after a dump cycle, the operation of which, will be described later. After such predetermined number of vends, the number of vends being counted b control means 90, control means 90 sends a signal over conduit 113 to solenoid valve means 13 to open, and over conduit 121 for motor 21M to start thereby pumping feed water with means 21 through the ROM thereby producing additional permeate. When enough permeate has been produced to cause the water level in tank 28 to reach the level of high water level set point, sensor means 54, sends a signal over conduit 154 to control means 90 which in turn signals valve means 13 over conduit 113 to close and motor 21M over conduit 121 to turn off thereby stopping means 21 from pumping more water to ROM 23.

When low level sensor means 55 senses that the liquid level in tank 28 is at the low level set point, means 55 signals control means 90 over conduit 155 which in turn signals motor 63M over conduit 163 to turn off if on, and if not on to remain off, and also signals valve means 13 over conduit 113 to open and motor 21M over conduit 121 to start thereby pumping more water to ROM 23. At the same time, control means 90 signals light 86, over conduit 186, on the exterior front face of the vending machine to illuminate thereby indicating to the purchaser that the machine is temporarily out of service. Low level sensor means 55 therefore prevents in combination with means 90, while the system is in the vending mode, tank 28 from being completely emptied.

In one embodiment the capacity of tank 28 is from about 30 to about 90 gallons, preferably from about 45 to about 75 gallons, and especially preferably from about 55 to about 65 gallons, or about 60 gallons.

Purified water is discharged from tank 28 through lines 56 and 60 and valve 57 to vending pump 63. Valve 57 is for maintenance purposes only and is normally open. Water is removed from pump 63 through line 64 and then flows through either deionization means 67 or activated carbon filter means 73 as will be explained. If the water purchaser wants drinking water, he presses button means 87 on the front face of the vending machine which indicates that his selection is Drinking Water, thereby signaling control means 90 over conduit 187 of his choice. Button means 87 also comprises a light which remains illuminated while water is being dispensed. Electronic control means 90 then signals solenoid valve means 71 over conduit 171 to open and motor 63M over conduit 163 to start thereby causing pump means 63 to pump permeate from tank 28 into activated carbon filter means 73 through lines 66 and 72. In this mode solenoid valve means 69 remains closed. Activated carbon filter means 73 is designed to remove essentially 100% of all low molecular weight organic contaminants and nearly all residual chlorine from the permeate charged thereto and to produce a drinking water having superior taste. Drinking water is removed from means 73 through line 74 and introduced into volume control meter means 76, antisyphon means 78, and outlet means 81, connected by lines 77 and 79 respectively.

Ultraviolet light sterilization means 80 surrounds conduit section 82 which is transparent to ultraviolet lisht, i.e. UV light. Control means 90 signals volume control meter means 76 over conduit 176 to dispense a predetermined amount of water to outlet 79 as will be further described. Antisyphon means 78 preferably is an air gap type device which prevents syphoning water through outlet 81 back into the vending machine and phereby serves as a means to prevent contamination of water in the vending system through the dispensing outlet. Outlet means 81 is also preferably designed so as to prevent objects from being stuck up the outlet port thereof and to prevent other malicious tampering with the dispensing means outlet. Conduit 79 contains conduit section 82 which is transparent to UV light of a wavelength effective for bacterial and viral destruction of bacteria and virus contained in water flowing through section 82.

Ultraviolet sterilization means 80 preferably is capable of effecting 100%, or nearly 100%, kill of all bacteria and virus in the vended water. In one embodiment means 80 is operable to sterilize a flow of clear fresh water of at least about 1 gpm and has an UV dosage of at least about 30,000 microwatts-seconds per square centimeter. In case the intensity of UV light from means 80 falls below a predetermined value, sensor means 85 in sterilization means 80 sends a signal over conduit 185 to electronic control means 90 which in turn signals motor 63M, over conduit 163 to stop thereby causing vending pump means 63 to stop pumping permeate until the intensity of UV light is increased to said predetermined value which is usually effected by replacement of UV emitting bulb. UV sterilization means 80 is mounted on the cabinet door immediately upstream of outlet means 81 so that all bacteria in the vended water is killed just prior to the entry of the water into relatively short-length outlet means 81. In one embodiment UV means 80 remains on at all times. Electrical line 180 supplies power to UV means 80.

Some governmental regulations in some locations require all water vended as "Purified Water" to have no more than 10 ppm of dissolved solids. In areas in which the local domestic drinking water or tap water is particularly high in dissolved solids, even a ROM having a designed percent rejection of 98% may not be capable of reducing the total dissolved solid content of the permeate, e.g. stream 27, to 10 ppm or less. Accordingly to insure that the purchaser, who in fact wants water meeting a standard of 10 ppm or less, actually receives vended water having no more than 10 ppm total dissolved solids content, the vending system is provided with deionization means 67 which will remove additional dissolved solids in the permeate to a level of 10 ppm or less. In this mode, the purchaser who wants "Purified Water" meeting the 10 ppm or less total dissolved solid standard presses button means 88 on the front face of the vending machine identified as "Purified Water" thereby signaling control means 90 over conduit 188 of his choice of product water. Button means 87 and 88 also each comprise a light which will illuminate while water is being dispensed. Control means 90 then signals solenoid valve means 69 over conduit 169 to open and motor 63M, over conduit 163 to start thereby causing pump means 63 to pump permeate from tank 28 to conduit 64, means 67 and valve means 69, which are connected by lines 65 and 68 respectively. Solenoid valve means 71 remains closed when the system is dispensing in the "Purified Water" mode. From valve means 69 deionized or "Purified Water" enters meter means 76 through line 70 and thence eventually into outlet means 81 in a manner similar to that of the previously described Drinking Water vend. Volume control meter means 76 perferably is designed to dispense unit volumes, preferably one gallon quantities, of water within an accuracy of ±2%.

It is preferred to have some chlorine present in the water stored in tank 28 to prevent bacteria buildup. The small amount of chlorine present in tank 28 is also effective in preventing bacteria buildup in deionization means 67. This is desirable since deionizers have a tendency to permit bacteria growth where the chlorine content of the water is nearly completely removed. Activated carbon filters have a tendency to permit bacteria buildup since such filters remove essentially all the residual chlorine in the permeate. For this reason in this embodiment means 67 is not downstream of and in series with means 73. Because of the very low level of remaining chlorine the carbon filter must be changed periodically, as for example every six months more or less, depending in part upon the extent of usage of the system.

Another advantage of having the filter means 73 and deionization means 67 on parallel but separate flow paths is that by so doing the deionization media in means 67 is conserved and only used when deionized or "Purified Water" is actually wanted by the vendee. Since means 67 will remove a limited number of ions before the deionization media therein is expended, conserving its usage will reduce the frequency of servicing required for the vending machine. The ions removed are of course ions other than ions formed from pure water, i.e., $H_2O$. Deionization means 67 replaces cation impurities with $H^+$ ion and anion impurities with $OH^-$ ion. Non-limiting examples of deionization media suitable for deionization of the permeate are mixed bed deionization resins comprising hydroxyl form strong base alkyl quaternary ammonium polystyrene copolymer and hydrogen form sulfonated polystyrene copolymer. Nonlimiting examples of such mixed bed deionization resins are those with a certain functional structure such as $SO_3H^+$ and an anion functional structure such as $R_4H^+OH^-$. A nonlimiting example of such mixed cation and anion functional structures are The Purolite Company brand NRW 37 and NRW 37C resins. The technical data and specifications of the NRW 37 and 37C resins are described in The Purolite Company's product description brochure of June 1986 which is hereby incorporated herein by reference.

In this vending system since means 67 is downstream of ROM 23, the deionization medium of means 67 is further conserved since the ROM removes from about 75% to about 90% or more of the ions contained in the water charge thereto. The overall effect of having means 67 downstream of the ROM and in parallel circuitry with activated carbon filter means 73 is to reduce the frequency of replacement of means 67 by a factor of about twenty which substantially reduces the frequency of maintenance required and hence improves the profitability of the system.

In order to prevent tank 28 from collapsing as water is discharged therefrom, tank 28 is provided with breather line 83 which is connected to enclosure 80E which surrounds ultraviolet light sterilization means 80, conduit section 82 and sensor means 85. Enclosure 80E is not air tight so that air can enter into the ultraviolet light radiation chamber 80E. The air in radiation chamber 80E is sterilized and contains ozone. Sterilized air, as required to maintain tank 28 at atmospheric pressure, enters tank 28 through conduit 83. Thus in this invention contamination of water in tank 28 by breather air containing airborne bacteria is prevented by requiring all breather air to pass through, and be sterilized by, means 80 prior to allowing such air to be introduced into tank 28. This offers a substantial advantage over the art by allowing tank 28 to remain at all times at atmospheric pressure and free of bacteria contamination derived from breather air. In one embodiment UV means remains on at all times, not just during vends or drainage of tank 28 to assure that all air entering tank 28 is sterilized. Furthermore by maintaining some ozone in the atmosphere above the water in tank 28 bacteria growth in the water in tank 28 is also retarded. By permitting tank 28 to remain at atmospheric pressure, water leakage from the system is greatly reduced, maintenance requirements greatly reduced and profitability greatly improved.

In order to prevent the water in tank 28 from becoming stagnant and permitting the possible buildup of bacteria due to stagnation, the vending system of this invention is provided with a dump subsystem which is designed to discharge the entire contents of tank 28 to a sump if there are not a predetermined number of vends completed within a predetermined time period. In one embodiment if there are not at least from about 5 to about 15 vends within a period of time from about 24 to about 72 hours, tank 28 is drained. In one preferred embodiment if there are not at least about ten vends within about a 48-hour period, tank 28 is drained to a sump. The system's electronic control means 90 therefore comprises in this preferred embodiment a real time counter which counts the number of vends and if there are not at least a predetermined number of vends, e.g. ten vends within a predetermined period of time, e.g. a 48-hour period, control means 90 sends a signal over conduit 161 to solenoid valve means 61, which is normally closed, to open thereby allowing the permeate in tank 28 to drain through lines 56 and 59, through valve means 61 to line 62 which preferably discharges through an air gap, preferably an air gap of at least about three inches, into sump 51 or if desired directly into a drain. During the dump cycle the system's control means 90 is designed to send a signal over conduit 113 to close valve means 13 and turn off, and/or keep off, motor 21M to pump means 21 and motor 63M to pump means 63. Thus during the dump cycle water cannot be vended.

Means 90 can also comprise a real time clock to insure that programmed operations are carried out at desired times even if a power failure has occurred during any 24 hour period.

Another improvement in this invention is in the sump subassembly system. In order to prevent water which has been spilt by purchasers in the dispensing chamber from collecting on the floor outside the vending machine and to prevent water which may have inadvertently leaked from any of the various components and lines in the system from accumulating in the cabinet or housing 104 of the vending machine and causing rust and bacteria growth and other undesirable conditions, or leaking from the cabinet and collecting on the floor outside the vending machine, one embodiment of this vending machine comprises a sump subassembly which comprises sump or basin 51, sump pump means 52 and motor 52M, and sump liquid level sensor means 53.

Sump 51 is designed to cover the entire lower profile of the water containing components of the vending machine, as indicated schematically in FIG. 1, so that any component or line which leaks water will collect such leaked water in the sump. When the liquid level in sump 51 reaches a predetermined level or set point, liquid level sensor means 53 sends a signal over conduit 153 to control means 90 which in turn signals motor 52M over conduit 152 to start thereby causing pump means 52 to pump water from sump 51. Pump means 52 pumps the liquid in the sump 51 through line 84 into line 50, thence through check valve 49, thence through line 45 and into line 46. From line 46 the liquid flows through antisyphon means 47 and line 48 to drain. The system is also designed so that sump pump means 52 runs for a predetermined period of time after sensor means 53 transmits a signal to control means 90 that the liquid level is below the sump liquid level set point thereby insuring that sump 51 has been thoroughly drained. Preferably the predetermined period of time is about one minute after sensor means 53 transmits the signal that the sump liquid level is below the set point. As an additional safeguard to prevent the sump from overflowing in case of a system malfunction, sump 51 is also provided with high level sensor means 58. Should the liquid level in sump 51 reach a predetermined high level, sensor means 58 sends a signal over conduit 158 to control means 90 which in turn signals solenoid valve means 13 to close thereby preventing the flow of water into the system. When low level sensor means 53 senses that the sump is empty as described above, control means 90 permits solenoid means 13 to be opened upon need as discussed herein. However, once high level sensor means 58 senses liquid in sump 51, control means 90 overrides all other commands to solenoid means 13 to open until low level sensor means 53 signals that sump 51 is about empty. In a preferred embodiment sensor means 53, 58, 54 and 55 are proximity switches which generate magnetic fields. In an alternative embodiment sensors 53 and 58 are float type sensing devices. Antisyphon means 47 and 48 are preferably an air gap device which prevent suction of liquid back into the system.

Preferably all lines and components in the flow system which handle water are constructed from polypropylene or polyethylene or brass fittings on polyvinyl based plastic material or nylon. Nylon or polypropylene which are more rigid than the other two mentioned plastics are used where flexibility and/or flexing of the line or component is not necessary. For example tank 28 is preferably constructed of polypropylene as well as the lines which remain in a fixed location in the machine.

On the ROM permeate side, i.e. beginning with line 24 and downstream therefrom, preferably all the fittings are polypropylene or nylon. Other lines or conduits preferably are food grade tubing of polyethylene or polyvinyl based plastic material. Polyethylene based tubing is flexible and polyvinyl based tubing is very flexible. Tubing connected at one end to components which are attached to the door or other movable subassemblies of the vending machine and the other end to a component in the cabinet, is preferably polyethylene or polyvinyl based plastic. For example, line 79 which is connected at one end to tank 28 which is positioned in the center of the vending cabinet, and at the other end to means 80 which is preferably mounted on the inside surface of the vending machine's door, needs to be flexible to permit the door to be opened for servicing the machine without damaging line 79. Feed water and concentrate lines are preferably ¼ and/or ⅜ inch brass or polyethylene tubing with brass fittings.

The vending machine is preferably coin and/or credit card activated. For coin and currency activated machines the purchaser inserts the required coinage and/or currency into cash receptacle means 89 for the amount of water desired, positions one gallon size bottle 100 or similar container on shelf 92 in the dispensing chamber or recessed opening in the exterior front face of the vending machine cabinet and under outlet means 81 and presses button 87 or 88 on the front door for either "Drinking Water" or "Purified Water" respectively which in turn sends a signal to means 90 which energizes conduit 191 thereby illuminating light 91. The coinage deposited into cash or coin receptacle means 89 in combination with the act of depressing the push button, sends a signal over conduit 189 and either conduit 187 or 188, depending on which button the vendee presses, to control means 90 which then signals motor 63M over conduit 163 to start thereby causing vending pump means 63 to start pumping permeate and signals flow control meter means 76 over conduit 176 to dispense a predetermined amount of water depending on the amount of coinage inserted into the means 89.

The dispensing station recessed in the front face of the vending machine, is preferably equipped with two shelves 92 and 93. Upper shelf 92 will accommodate a standard one gallon size bottle under outlet means 81. Upper shelf 92 can be pivoted up and out of the way and then a five gallon or smaller bottle can be positioned on lower shelf 93 directly under outlet means 81.

If any malfunction of the system occurs, control means 90 will cause, by sending a signal over conduit 186, light 86 on the front face of the machine to illuminate. Light 86, when illuminated, informs the vendee that the machine is temporarily out of service. When light 86 is on, any coins inserted into coin receptacle 89 will be caused by control means 90, through a signal sent over conduit 194, to be returned to coin-return receptacle 94. Control means 90 will also prevent, while light 86 is on, motor 63M from being turned on thereby preventing dispensing of water from the machine.

If the vending machine is out of change and cannot return change to the vendee, control means 90, will send a signal over conduit 196, illuminating the "Exact Change" light, light 96, on the front face of the machine, which informs the vendee that exact coinage for the purchase is required. Nonlimiting examples of coin-changer systems are those sold under the trademark A COINCO, Model S75-9800B.

Preferably the interior of the vending machine cabinet is equipped with fan 102 vented to the outside to prevent the temperature inside the cabinet from becoming excessively hot and to provide for a continuous circulation of air inside the cabinet. The power line to fan 102 is not shown in FIG. 2 merely to not detract from the more important features. Power to fan 102 is supplied in a conventional manner.

In one embodiment the vending machine has accounting package subassembly which will count and record in recorder 95 the number of vends and the number of coins inserted into the coin box. As coins are accepted as payment for vended water, means 90, sends a signal corresponding to the amount of money accqpted over conduit 195 to recorder 95.

In one embodiment the machine has a telephone modem 98, telephonically connected to a mainframe computer (not shown) which permits diagnostic information recorded by recorder 95, such as the water quality and other self-diagnostic and accounting information, transmitted over conduit 198 to modem 98, to be transmitted by telephone over conduit 298 connect to a telephone line (not shown). For example the number of vends over a 24-hour period and the purity of the water as determined by sensor means 26 every three hours can be recorded by means 95. An output jack can be provided to input this and other data into a portable calculator for monthly or other periodic analysis by maintenance personnel at the machine's location.

In still another embodiment the machine is equipped with message module means 97 that will play a recorded audio and/or video message everytime coins are inserted into coin receptacle means 89. In this embodiment when the vendee pushes button means 87 or 88, control means 90, sends a signal over conduit 197 to audio means 97 which plays an audio message for about one minute for the vendee's enjoyment and information.

Preferably the machine is equipped with an attractive illuminated panel to encourage purchases of product water.

Features similar to the above described coin activated functions can also be included in the embodiment to permit vends by insertion of a credit card rather than, or in addition to coins.

FIGS. 3 to 8 are diagrams which indicate the logic conducted by control means 90 in controlling the operation of the vending machine. In these FIGS a hexagon represents a yes/no query that control means asks of itself from which a yes or no answer can be produced based upon information stored by means 90. Rectangles represent operations effected by means 90 and boxes wit rounded sides are merely points of information helpful to the understanding of the logic diagrams.

Figure 3:
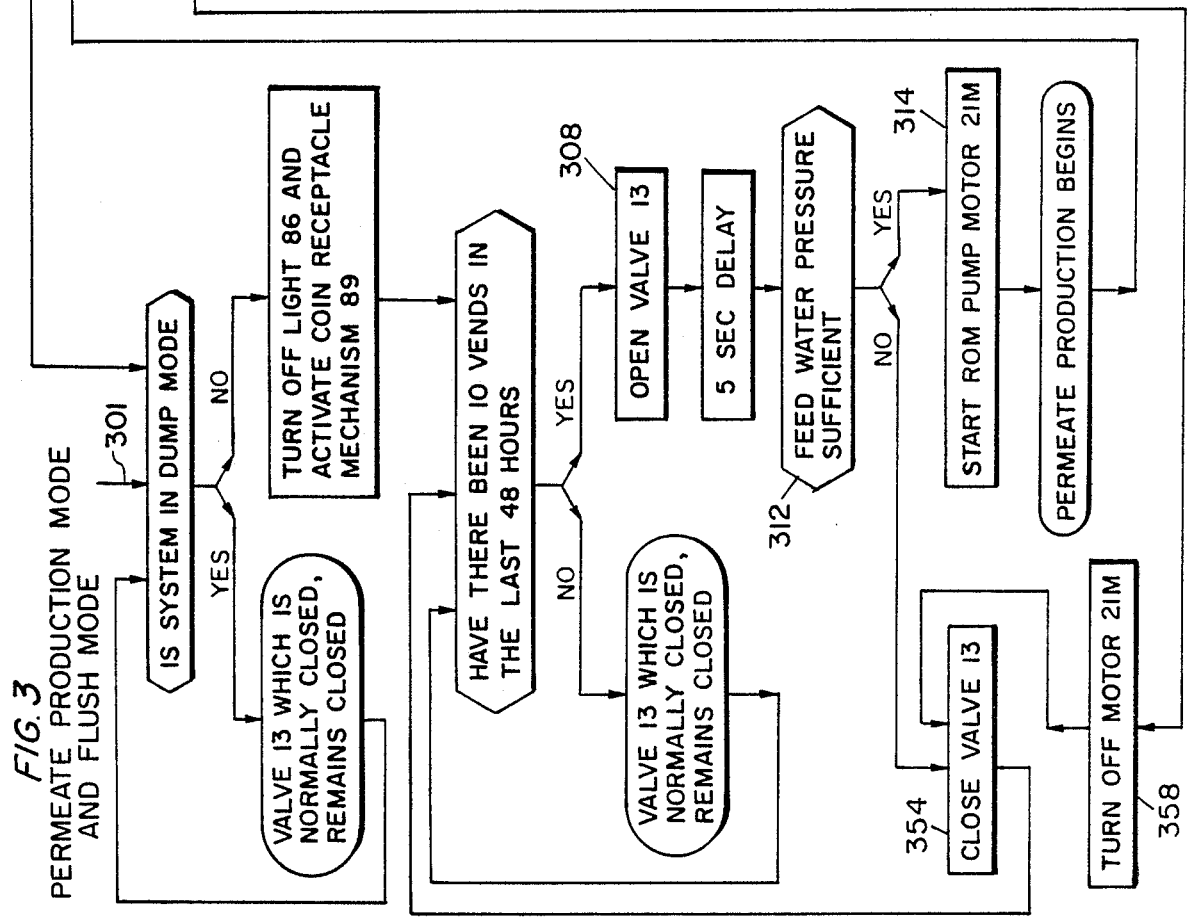
FIG. 3 is a diagram of the logic for the permeate production mode and flush mode of one embodiment of this invention.
Figure 3:
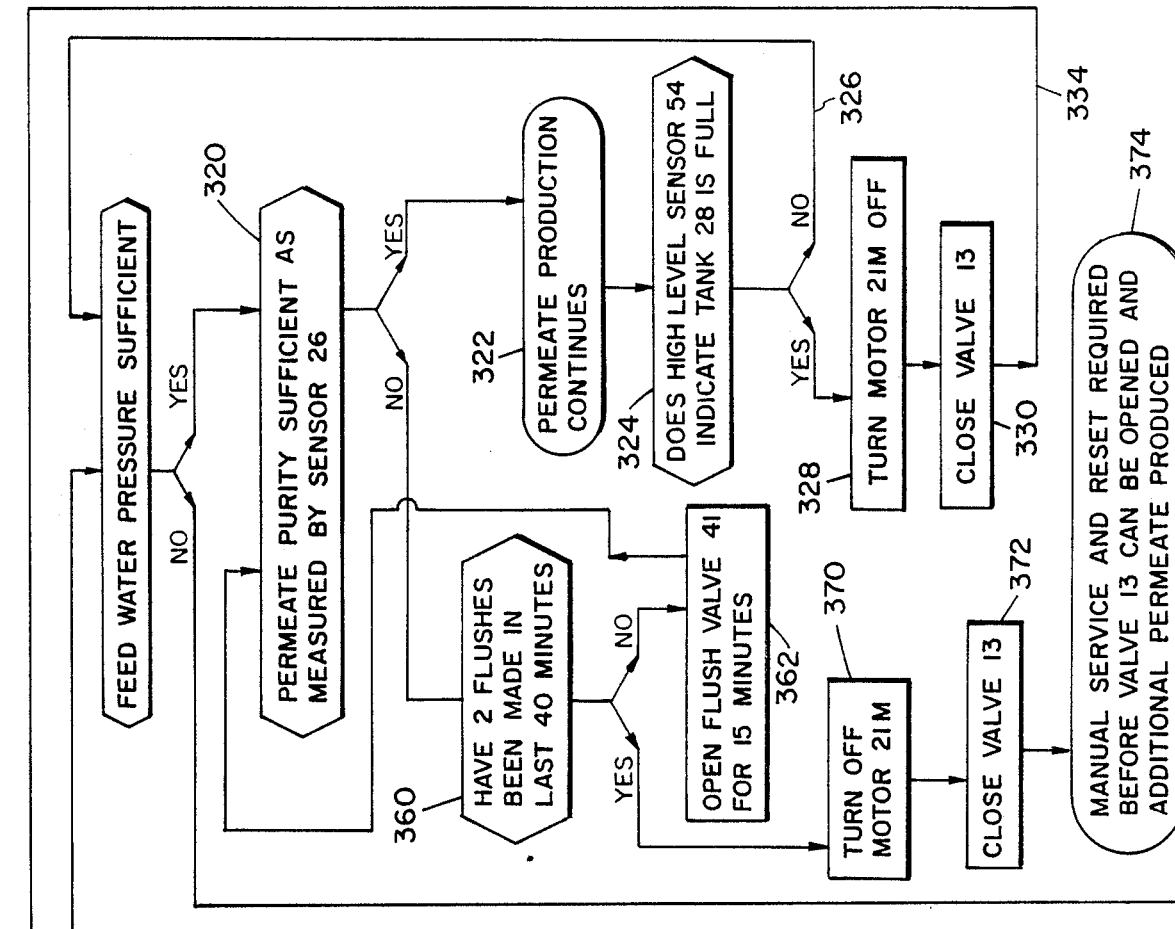

With reference to FIG. 3, means 90 continuously queries the system, shown by line 301, whether or not the system is in the dump mode. If the system is in the dump mode valve 13 remains closed thereby preventing permeate production and/or ROM flushing. If the system is not in the dump mode control means 90 determines if there has been a predetermined number of vends, e.g. ten vends, since the last permeate production run. If the predetermined number of vends has been made in the predetermined time period, e.g., the last 48 hours, means 90 opens valve 13 as indicated by box 308. After a predetermined delay, e.g. five seconds, means 90 determines, as shown in box 312, from a signal from pressure sensor 15 whether or not the gage water pressure in line 14 is high enough. If the water pressure is not high enough permeate production is delayed by closing valve 13 as shown in box 354 until water pressure reaches the set point of sensor means 15. When the water pressure is adequate, ROM pump motor 21M is started as indicated in box 314 and permeate production begins. Water pressure as measured by means 15 is constantly sensed and if at any time during permeate production the pressure is below the set point of sensor means 15, motor 21M is turned off and valve means 13 closed as indicated by boxes 358 and 354.

Means 90 through purity sensor means 26 continuously determines during permeate production whether or not the purity of permeate from the ROM exceeds the set point of sensor means 26 as indicated by box 320. If the purity of the permeate is too low, i.e. the conductivity of the permeate is too high, means 90 will initiate the flush mode of the ROM as indicated by box 362 unless there have been two recent previous flushes of the ROM within a predetermined period of time, e.g. two previous flushes within a forty minute period, as indicated by box 360. If after two flushes the permeate purity is still too low, motor 21M will be turned off and valve means 13 closed until manually reset set during servicing of the machine as indicated by boxes 370, 372 and 374. Although the permeate which is in tank 28 may still be vended, no additional permeate can be made until the machine is serviced to correct the cause of the low permeate purity.

If permeate purity is adequate, permeate production continues as indicated by box 322 until high level sensor means 54 signals means 90 that tank 28 is full as indicated by box 324 If tank 28 is not full, the system continues to ask whether or not the feed water pressure is sufficient as shown by line 326. When tank 28 is full, motor 21M is turned off and valve 13 close as indicated by boxes 328 and 330. Means 90 then resets its internal vend counter and is readied to begin counting the next set of vends required to commence permeate production as indicated by line 334.

With reference to FIG. 4, the machine determines whether or not there has been a predetermined number of vends within a predetermined period of time, and, if such number of vends has not occurred the permeate in tank 28 is deemed to be stale and the entire contents of tank 28 is drained in a dump cycle controlled by means 90. The dump mode logic illustrated by FIG. 4 is based on a requirement of ten vends in a 48 hour period. Means 90 continuously queries, as shown by line 401, whether there have been ten vends in the last 48 hours as indicated by box 402. If there have not been 10 vends in the last 48 hours, dump valve 61 is opened and light 86 illuminated on the front exterior face of the machine to indicate that the machine is temporarily out of service. At the same time valve 41 is closed to prevent flushing of the ROM and vend pump motor 63M is prevented from being turned on as indicated by box 404. Tank 28 then drains. When low level sensor means 55 signals that tank 28 is empty, valve 61 is closed and the internal dump mode vend counter of means 90 is reset as indicated by boxes 406 and 408.

FIG. 5 is the logic diagram for operation of the sump mode. The sump mode is initiated automatically if there is water in sump 51. Water in the sump can be caused by the dump cycle, by inadvertent water leaks from the system, or by the vendee failing to properly position a container under outlet means 81. In any event, means 90 continuously queries, as indicated by line 501, whether high-level sensor means 58 senses that water is at the high level mark in sump 51 as indicated by box 502. If water is at the high level mark then there has been a major leak in the system and means 90 will close valve means 13 as indicated by box 520. Servicins of the machine is required to manually reset valve means 13 so that it can be opened upon command by means 90 as indicated by box 530. Usually any water in sump 51 is below the high level mark. Means 90 also continuously queries whether water is in sump 51 at the low level mark as indicated by box 503. If water is at or higher than the low level mark in the sump, means 90 will energize conduit 152 to start sump pump motor 52M thereby draining the sump as indicated by box 504. When water is below the low level mark in sump 51 the sump pump will continue to pump for a predetermined delay period of time, e.g. 60 seconds, and then shut off as indicated by boxes 512 and 514.

FIG. 6 is a logic diagram for the operation of the vending mode. The vending mode is initiated by insertion of proper coinage into coin box 89 and pushing of button 87 or 88. Before water can be vended, however, means 90 continuously queries whether UV light source has adequate intensity to sterilize vended water as indicated by line 601 and box 602. If the intensity of UV light source 80 is below a predetermined value, out-of-service light 86 is illuminated and vend pump motor 63M must be manually reset before control means 90 can command motor 63M to restart as indicated by boxes 630 and 632. Means 90 then determines whether tank 28 is empty as indicated by box 604. After vendee has deposited coins and made his selection by pushing either button 87 or 88, means 90 in combination with coin mechanism and coin changer means, as indicated by boxes 608, 620, 622, 624, 626 and 640, will effect either a drinking water or pure water vend as indicated by line 612 leading to FIG. 7 or FIG. 8 respectively.

FIG. 7 is a logic diagram for means 90 for a drinking water vend. After general logic diagram shown in FIG. 6, the particular water type selected determines whether the final operation proceeds by the logic shown in FIG. 7 or FIG. 8 as indicated by line 612. Upon depressing button 87, button 87 and light 91 are illuminated, motor 63M started and audio module 97 activated by means 90 as indicated in box 720. Meter means 76 shuts motor 63M off when proper amount of water is dispensed as indicated by box 722. Thereafter valve 71 is closed and light 87 turned off as indicated by box 724. After a predetermined period of time, control means 90 sends a signal over conduit 191 to turn light 91 off. The machine is ready for the next vend as indicated by boxes 732, 734 and 736.

FIG. 8 is a logic diagram for means 90 for a pure water vend. Upon depressing button 88, button 88 and light 91 are illuminated, motor 63M started and module 97 activated by means 90 as indicated in box 820. Meter means 76 shuts motor 63M off when purchased amount of water is dispensed as indicated by box 822. Thereafter valve 69 is closed, light 87 turned off. Then after a delay light 91 is turned off and the machine is ready for the next vend as indicated by boxes 824, 832, 834 and 836 respectively.

What is claimed is:

1. A vending apparatus for dispensing water comprising:
    apparatus-inlet means for introducing water into said vending apparatus;
    module-pump means, having a module-pump inlet and a module-pump outlet, for pumping water to an elevated pressure;
    inlet-pump connective means for connecting said apparatus-inlet means to said module-pump inlet;
    a reverse osmosis module having a module inlet for introducing water into said module, a semipermeable membrane operable for separating water pumped into said module under pressure into
        (i) a permeate containing a rduced amount of solids and dissolved substances, and
        (ii) a concentrate containing enriched amounts of solids and dissolved substances,
    a permeate module outlet in a first part of said module for removing permeate and a concentrate module outlet in a second part of said module for removing concentrate, said second part being separated from said first part by said membrane;
    pump module connective means for connecting said module-pump outlet to said module inlet;
    disposal-outlet means, connected to said concentrate module outlet, for discharging concentrate from said vending apparatus to a drain;
    water tank having a tank inlet and a tank outlet;
    module-tank connective means for connecting said permeate module outlet to said tank inlet;
    vend-pump means, having a vend-pump inlet and a vend-pump outlet, for pumping water from said water tank;
    tank-pump connective means for connecting said tank outlet to said vend-pump inlet;
    dispensing means, having a dispensing inlet and a dispensing outlet, for dispensing water from said vending apparatus;
    pump-dispensing connective means for connecting said
    vend-pump outlet to said dispensing inlet;
    dump valve means having a dump valve inlet and a dump valve outlet;
    tank-valve connecting means for connecting said tank outlet to said valve inlet, said dump valve means for shutting off the flow of water in said tank-valve connective means;
    discharge means, connected to said dump valve outlet, for discharging water from said dump valve to a drain; and
    control means operable for automatically opening said dump valve means by signal from said control means to said dump valve means if there has not been at least a predetermined number of vends of water within a predetermined period of time, said control means also operable for opening said dump valve means for a length of time sufficient to discharge at least substantially all water in said water tank through said dump valve means to said discharge means and thereafter for automatically closing said dump valve means.

2. The apparatus of claim 1, wherein said control means includes means for automatically opening said dump valve means by signal from said control means to said dump valve means if there has not been at least a predetermined number of vends of water from said apparatus of from about 7 to about 13 within a predetermined period of time of from about 1 to about 3 days.

3. The apparatus of claim 2, wherein said control means includes means for automatically opening said dump valve means by signal from said control means to said dump valve means if there has not been at least a predetermined number of vends of water from said apparatus of about 10 within a predetermined period of time of about 24 hours.

4. The apparatus of claim 1, wherein said vend-pump means is operable for activation by signal from said control means;
wherein said control means includes means for automatically preventing said vend-pump means from pumping when said control means opens said dump-valve means thereby preventing water from being vended; and
wherein said control means includes means for automatically permitting said vend-pump means to pump water from said water tank to said dispensing means upon a demand signal from said control means when said dump-valve means is closed thereby permitting the vending of water.

5. The apparatus of claim 1, wherein said dispensing means also comprises a conduit section between said dispensing inlet and said dispensing outlet which is transparent to ultraviolet light of a wavelength effective for bacterial and viral destruction; and
wherein said vend-pump means is operable for activation by signal from said control means; and
further comprising ultraviolet light source for radiating said conduit section of said dispensing means, said ultraviolet light source having an ultraviolet intensity operable for effecting sterilization of water flowing through said conduit section of said dispensing means;
ultraviolet light sensing means operable for sensing the intensity of ultraviolet light proximate said conduit section of said dispensing means, and operable for sending a signal to said control means related to intensity sensed; and wherein
said control means is also operable for automatically deactivating said vend-pump means when the intensity of ultraviolet light sensed by said ultraviolet light sensing means is less than a predetermined value.

6. The apparatus of claim 5, further comprising
an enclosure surrounding said conduit section of said dispensing means, said ultraviolet light source and said ultraviolet sensing means, said enclosure permitting the flow of air thereinto; and
a breather conduit having one end in communication with the top inside portion of said water tank and the other end in communication with said enclosure, said breather conduit for permitting air radiated by said ultraviolet light source in said enclosure to flow from said enclosure into the top of said water tank when water is removed from said tank thereby permitting said tank to be at atmospheric pressure.

7. The apparatus of claim 6, wherein said ultraviolet light source includes means for radiating the air in said enclosure whereby the air contains ozone which enters said water tank thereby retarding bacteria growth in said water tank when said apparatus is in use.

8. The apparatus of claim 1, further comprising:
sump means comprising a basin for collecting water, sump-pump means operable for activation by signal from said control means and having a sump-pump inlet and a sump-pump outlet for pumping water from said basin, low level sump sensor means for detecting water at a predetermined low level elevation in said basin and for sending a signal to said control means of such event, sump-pump connective means for connecting said basin to said sump-pump inlet, and disposal-outlet means connected to said sump-pump outlet for discharging water from said basin and said sump-pump means to a drain;
a housing surrounding said module, said water tank and all of said aforementioned means, said basin being in the lower part of said housing and extending across the horizontal inside profile of said housing such that components between said apparatus-inlet means and said disposal outlet means and between said apparatus-inlet means and said dispensing means are above said basin and also such that the horizontal profile of said components lie within the horizontal profile of said basin thereby allowing water leaked from said components to be collected by said basin; and
wherein said control means is also operable for automatically activating, when water is in said basin at an elevation at least as high as said predetermined low level elevation, said sump-pump means for a period of time sufficient to reduce the level of water in said basin to below said predetermined low level elevation, and for automatically deenergizing said sump-pump means when the level of water in said basin is below said predetermined low level elevation.

9. The apparatus of claim 8, further comprising main-inlet valve means, located in said inlet-pump connective means, for shutting off the flow of water into said module-pump means, said main-inlet valve means being operable for activation by signal from said control means; and
wherein said sump means further comprises high level sensor means for detecting water at a predetermined high level elevation in said basin and for sending a signal to said control means of such event; and
wherein said control means is also operable for automatically closing said main-inlet valve means and maintaining said valve means closed until said main-inlet valve means is manually reset when water is detected at said predetermined high level elevation in said basin by said high level sensor means.

10. The apparatus of claim 1, wherein said module-pump means is operable for activation by signal from said control means, and
further comprising a prefilter located in said inlet-pump connective means operable for removing solid particles from water;
main-valve means, operable for activation by signal from said control means and located in said inlet-pump connective means, for shutting off the flow of water into said inlet-pump connective means;
pressure sensing means for sensing the gage pressure in said inlet-pump connective means and for sending a signal related to such gage pressure to said control means, said pressure sensing means being located downstream of said prefilter; and wherein said control means is also operable for automatically closing said main-valve means and deactivating said module-pump means when said pressure sensing means senses that the gage pressure in said inlet-pump connecting means is less than a predetermined value, while simultaneously permitting said vend-pump means to be activated by signal from said control means thereby permitting the vending of water from said apparatus upon demand signal from said control means.

11. The apparatus of claim 10, wherein said main valve means is downstream of said prefilter.

12. The apparatus of claim 11, wherein said pressure sensing means is downstream of said main valve means.

13. The apparatus of claim 10, wherein said control means includes means for automatically closing said main-valve means and deactivating said module-pump means when said pressure sensing means senses that the gage pressure in said inlet-pump connecting means is less than a predetermined value of gage pressure of from about 3 to about 15 psig.

14. The apparatus of claim 1, wherein said disposal-outlet means has a disposal inlet and a disposal outlet; and further comprising module-disposal connective means having a flow restrictive means, wherein said disposal inlet is indirectly connected to said concentrate module outlet by said module-disposal connective means, and wherein said disposal-outlet is connected to said drain;

wherein said vend-pump means is operable for activation by signal from said control means; and still further comprising purity sensor means, located in said module-tank connective means, for sensing the permeate purity therein and for sending a signal related to such permeate purity to said control means;

flush bypass line having a bypass inlet connected to said module concentrate outlet and a bypass outlet connected to said disposal inlet, said flush bypass line providing a parallel water flow path to the water flow path provided by said module-disposal connective means;

flush valve means, located in said flush bypass line, for stopping the flow of water thereto, and operable for activation by signal from said control means; and wherein said control means is operable for automatically opening said flush valve means for a predetermined flush length of time, when said purity sensor means senses that the permeate purity is below a predetermined standard, thereby flushing said module and cleansing said semipermeable membrane while simultaneously permitting said vend pump means to be activated by signal from said control means thereby permitting the vending of water from said apparatus upon demand signal from said control means.

15. The apparatus of claim 14, wherein said control means includes means operable for automatically effecting a second flush of said module if the permeate quality immediately after a first flush is still below said predetermined standard.

16. The apparatus of claim 15, further comprising main-valve means, operable for activation by signal from said control means and located in said inlet-pump connective means, for stopping the flow of water into said inlet-pump connective means; and wherein said control means is operable for automatically closing said main valve means and maintaining said main valve means closed until said main valve means is manually reset if after two consecutive module flushes within a predetermined period of time the permeate quality is still below said predetermined standard while simultaneously permitting said vend-pump means to be activated by signal from said control means thereby permitting the vending of water from said apparatus upon demand signal from said control means.

17. A vending apparatus for dispensing water comprising:

apparatus-inlet means for introducing water into said vending apparatus;

control means;

module-pump means, operable for activation by signal from said control means and having a module-pump inlet and a module-pump outlet, for pumping water to an elevated pressure;

inlet-pump connective means for connecting said apparatus-inlet means to said module-pump inlet;

a reverse osmosis module having a module inlet for introducing water into said module, a semipermeable membrane operable for separating water pumped into said module under pressure into
  (i) a permeate containing a reduced amount of solids and dissolved substances and
  (ii) a concentrate containing enriched amounts of solids and dissolved substances.

a permeate module outlet in a first part of said module for removing permeate and a concentrate module outlet in a second part of said module for removing concentrate, said second part being separated from said first part by said membrane;

pump-module connective means for connecting said module-pump outlet to said module;

disposal-outlet means, having a disposal inlet and disposal outlet, for discharging concentrate from vending apparatus to a drain;

module-disposal connective means for connecting said concentrate module outlet to said disposal inlet, said module-disposal connective means having a flow restrictive means;

water tank having a tank inlet and a tank outlet;

module-tank connective means for connecting said permeate module outlet to said tank inlet;

vend-pump means, operable for activation by signal from said control means and having a vend-pump inlet and a vend-pump outlet, for pumping water from said water tank;

tank-pump connective means for connecting said tank outlet to said vend-pump means;

dispensing means, having a dispensing inlet, a dispensing outlet and a conduit section between said dispensing inlet and said dispensing outlet which is transparent to ultraviolet light of a wavelength effective for bacterial and viral destruction, for dispensing water from said vending apparatus;

pump-dispensing connective means for connecting said vend-pump outlet to said dispensing inlet;

dump valve means operable for activation by signal from said control means and having a dump valve inlet and a dump valve outlet;

tank-valve connecting means for connecting said tank outlet to said dump valve inlet, said dump valve means for shutting off the flow of water in said tank-valve connecting means;

discharge means, connected to said dump valve outlet, for discharging water from said dump valve to a drain;

ultraviolet light sourc for radiating said conduit section of said dispensing means, said ultraviolet light source having an ultraviolet intensity operable for effecting sterilization of water flowing through said conduit section of said dispensing means;

ultraviolet light sensing means operable for sensing the intensity of ultraviolet light proximate said conduit section of said dispensing means, and operable for sending a signal to said control means related to intensity sensed;

an enclosure surrounding said conduit section of said dispensing means, said ultraviolet light source and said ultraviolet light sensing means, said enclosure permitting the flow of air thereinto; and breather conduit having one end in communication with the top inside portion of said water tank and the other end in communication with said enclosure, said breather conduit for permitting air radiated by said ultraviolet light source to flow from said enclosure into the top of said water tank when water is removed from said tank thereby permittins said tank to be at atmospheric pressure;

sump means comprising a basin for collecting water, sump-pump means operable for activation by signal from said control means and having a sump-pump inlet and a sump-pump outlet for pumping water from said basin, low level sump sensor means for detecting water at a predetermined low level elevation in said basin and for sending a signal to said control means of such event, sump-pump connective means for connecting said basin to said sump-pump inlet, and disposal-outlet means connected to said sump-pump outlet for discharging water from said basin and said sump-pump means to a drain;

a housing surrounding said module, said water tank and all of said aforementioned means, said basin being in the lower part of said housing and extending across the horizontal inside profile of said housing such that components between said apparatus-inlet means and said disposal outlet means, and between said apparatus-inlet means and said dispensing means, and between said tank and said discharge means, are above said basin, and also such that the horizontal profile of said components lie within the horizontal profile of said basin thereby allowing water leaked from said components to be collected by said basin;

a prefilter located in said inlet-pump connective means operable for removing solid particles from a source of water;

main-valve means, operable for activation by signal from said control means and located in said inlet-pump connective means, for shutting off the flow of water into said inlet-pump connective means;

pressure sensing means for sensing the gage pressure in said inlet-pump connective means and for sending a signal related to such gage pressure to said control means, said pressure sensing means being located downstream of said prefilter;

purity sensor means, located in said module-tank connective means, for sensing the permeate purity therein and for sending a signal related to such permeate purity to said control means;

flush bypass line having a bypass inlet connected to said module concentrate outlet and a bypass outlet connected to said disposal inlet, said flush bypass line providing a parallel water flow path to the water flow path provided by said module-disposal connective means;

flush valve means, located in said flush bypass line, for stopping the flow of water thereto, and operable for activation by signal from said control means; and wherein said control means is operable for automatically opening said dump valve means by signal from said control means to said dump valve means if there has not been at least a predetermined number of vends of water within a predetermined period of time, said control means also being operable for opening said dump valve means for a length of time sufficient to discharge at least substantially all water in said water tank through said dump valve means to said discharge means and thereafter for automatically closing said dump valve means.

said control means also being operable for automatically preventing said vend-pump means from pumping when said control means opens said dump-valve means thereby preventing water from being vended, said control means also being operable for automatically permitting said vend-pump means to pump water from said water tank to said dispensing means upon a demand signal from said control means when said dump-valve means is closed thereby permitting the vending of water, said control means also being operable for automatically deactivating said vend-pump means when the intensity of ultraviolet light sensed by said ultraviolet light sensing means is less than a predetermined value, said control means also being operable for automatically activating, when water is in said basin at an elevation at least as high as said predetermined low level elevation, said sump-pump means for a period of time sufficient to reduce the level of water in said basin to below said predetermined low level elevation, and for automatically deenergizing said sump-pump means when the level of water in said basin is below said predetermined low level elevation, said control means also being operable for automatically closing said main-valve means and deactivating said module-pump means when said pressure sensing means senses that the gage pressure in said inlet-pump connecting means is less than a predetermined value, while simultaneously permitting said vend-pump means to be activated by signal from said control means thereby permitting the vending of water from said apparatus upon demand signal from said control means, and said control means also being operable for automatically opening said flush valve means for a predetermined flush length of time, when said purity sensor means senses that the permeate purity is below a predetermined standard, thereby flushing said module and cleaning said semipermeable membrane while simultaneously permitting said vend pump means to be activated by signal from said control means thereby permitting the vending of water from said apparatus upon demand signal from said control means.

18. The apparatus of claim 17, wherein said sump means further comprises high level sensor means for detecting water at a predetermined high level elevation in said basin and for sending a signal to said control means of such event;

said control means also being operable for automatically closing said main-inlet valve means and maintaining said valve means closed until said main-inlet valve means is manually reset when water is detected at said predetermined high level elevation in said basin by said high level sensor means;

said control means also being operable for automatically effecting a second flush of said module if the permeate quality immediately after a first flush is still below said predetermined standard; and said control means also being operable for automatically closing said main valve means and maintaining said main valve means closed until said valve means is manually reset if after two consecutive module flushes within a predetermined period of time the permeate quality is still below said predetermined standard while simultaneously permitting said vend-pump means to be activated by signal from said control means thereby permitting the vending of water from said apparatus upon demand signal from said control means.

19. A vending apparatus for dispensing water comprising:

apparatus-inlet means for introducing water into said vending apparatus;

module-pump means, having a module-pump inlet and a module-pump outlet, for pumping water to an elevated pressure;

inlet-pump connective means for connecting said apparatus-inlet means to said module-pump inlet;

a reverse osmosis module having a module inlet for introducing water into said module, a semipermeable membrane operable for separating water pumped into said module under pressure into (i) a permeate containing a reduced amount of solids and dissolved substances, and (ii) a concentrate containing enriched amounts of solids and dissolved substances, a permeate module outlet in a first part of said module for removing permeate and a concentrate module outlet in a second part of said module for removing concentrate, said second part being separated from said first part by said membrane;

pump-module connective means for connecting said module-pump outlet to said module;

orifice means having an orifice inlet and an orifice outlet;

module-orifice connective means for connecting said concentrate module outlet to orifice inlet;

orifice-pump connective means for connecting said orifice outlet to said module-pump inlet and for recycle of concentrate to said module;

pressure regulator valve having an inlet and an outlet;

module-valve connective means, for connecting said concentrate module outlet to said pressure regulator valve inlet;

disposal-outlet means, having a disposal inlet and a disposal outlet, for discharging concentrate from said vending apparatus to a drain;

disposal-regulator connective means for connecting said pressure regulator valve outlet to said disposal inlet;

water tank having a tank inlet and a tank outlet;

module-tank connective means for connecting said permeate module outlet to said tank inlet;

control means;

vend-pump means, operable for activation by signal from said control means and having a vend-pump inlet and a vend-pump outlet, for pumping water from said water tank;

tank-pump conective means for connecting said tank outlet to said vend-pump means;

flow meter means, having a meter inlet and a meter outlet, for metering a predetermined amount of water and operable for activation by signal from said control means;

first pump-meter connective means for connecting said vend-pump outlet to said meter inlet;

post filter means, located in said first pump-meter connective means and having a carbon filter for removal of organic contaminants from water pumped therethrough;

filter valve means located in said first pump-meter connective means for stopping the flow of water therein and operable for activation by signal from said control means;

second pump-meter connective means for connecting said vend-pump outlet to said meter inlet and providing a water flow path from said vend-pump means to said flow meter means which is separate from the water flow path provided by said first pump-meter connective means;

deionization means, located in said second pump-meter connective means and comprising a deionization medium for removal of ions from water pumped therethrough;

deionization valve means, located in said second pump-meter connective means, for stopping the flow of water therein and operable for activation by signal from said control means;

dispensing means, having a dispensing inlet and a dispensing outlet, for dispensing water from said vending apparatus;

meter-dispensing connective means for connecting said meter outlet to aid dispensing inlet;

payment and selection means, comprising a first and second selection devices, and operable for activation by manual insertion of a predetermined form of payment into said payment and selection means and manual activation of one of said selection devices, said payment and selection means upon activation being operable for automatically sending a signal to said control means to activate said vend-pump means and said meter means to dispense a predetermined amount of water, wherein if said first selection means is manually activated said payment and selection means sends a signal to said control means which causes said control means to open said filter valve means, wherein if said second selection means is manually activated said payment and selection means sends a signal to said control means which causes said control means to open said deionization valve means; and wherein said pressure regulator valve is adjusted to a predetermined gage pressure at the inlet thereof thereby effecting a predetermined percent of concentrate recycle, such that when said module-pump means is pumping water to said module, the percent of concentrate from said module which is recycled back to said module is predetermined, and wherein only one pressure regulator valve is used to effect said predetermined percent of concentrate recycle.

20. The apparatus of claim 19, wherein said flow regulation means includes adjustment means for effecting a recycle concentrate flow through said orifice means of from about 35 to about 95% of the concentrate flow from said concentrate module outlet.

21. The apparatus of claim 19, wherein said flow regulation means includes adjustment means for effecting a recycle concentrate flow through said orifice means of from more than 50 to about 85% of the concentrate flow from said concentrate module outlet.

22. The apparatus of claim 19, wherein said post filter means is downstream of said filter-valve means and said deionization means is upstream of said deionization valve means.

23. The apparatus of claim 19, further comprising
dump valve means operable for activation by signal from a control means and having a dump valve inlet and a dump valve outlet;
tank-valve connecting means for connecting said tank outlet to said dump valve inlet, said dump valve means for shutting off the flow of water in said tank-valve connective means;
discharge means, connected to said dump valve outlet, for discharging water from said dump valve to a drain; and
wherein said control means is also operable for automatically opening said dump valve means by signal from said control means to said dump valve means if there has not been at least a predetermined number of vends of water within a predetermined determined period of time, said control means opening said dump valve maans for a length of time sufficient to discharge at least substantially all water in said water tank through said dump valve means to said discharge means and thereafter for automatically closing said dump valve means.

24. The apparatus of clain 19, wherein said deionization means comprises a mixed bed of deionization resins which comprise hydroxyl form strong base alkyl quaternary ammonium polystyrene copolymer and hydrogen form sulfonated polystyrene copolymer.

25. The apparatus of claim 19, wherein said deionization means inlucdes means for reducing the dissolved solids content of vended water to a value no greater than about 10 ppm when said apparatus is in use.

26. The apparatus of claim 19, wherein said deionization means includes means for increasing the resistivity of vended water to a value of at least about 10 megohm-centimeters when said apparatus is in use.

* * * * *